APPARATUS FOR EPITAXIALLY PRODUCING A LAYER ON A SUBSTRATE

Filed Aug. 28, 1964 2 Sheets-Sheet 1

WITNESSES:
John G. Chopp
James F. Young

INVENTORS
Lilburn H. Garrison and
William E. Winter
BY
F. E. Browder
ATTORNEY

United States Patent Office 3,459,152
Patented Aug. 5, 1969

3,459,152

APPARATUS FOR EPITAXIALLY PRODUCING A LAYER ON A SUBSTRATE

Lilburn H. Garrison, Ligonier, and William E. Winter, Murrysville, Pa., assignors to Westinghouse Electric Corporation, Pittsburgh, Pa., a corporation of Pennsylvania Filed Aug. 28, 1964, Ser. No. 392,734
Int. Cl. B05c *11/00*
U.S. Cl. 118—5 4 Claims

ABSTRACT OF THE DISCLOSURE

Apparatus for growing epitaxial layers of semiconductor material on a single crystal substrate includes a means for connecting each substrate into a separate electrical circuit. Each circuit includes a means for monitoring the current flowing in the circuit. The power supplied to the electrical circuit is constantly adjusted automatically in response to the current sensing means thereby preventing the substrate and its epitaxial growth from exceeding a predetermined maximum temperature and keeping the substrate within a predetermined temperature range.

This invention relates to apparatus and the process for epitaxially depositing an overgrowth layer onto a substrate.

In the prior art epitaxial process for depositing an overgrowth layer, such as silicon, onto a substrate, such as silicon, a quartz reaction tube is supported in a horizontal position. The substrate, which may be silicon slices, is placed on a graphite boat and positioned in the reaction tube. The reaction tube and the boat is then heated by some satisfactory means, such as a radio frequency generator. Highly purified hydrogen carrier gas carrying a silicon halide is injected into the reaction chamber and passes over the heated substrate and deposits a layer of silicon on the exposed surface of the substrate. The excess gas is then discharged from the reaction chamber. This process has several serious drawbacks or disadvantages. Since the graphite boat is heated to a higher temperature than the substrate, impurities in the boat are driven out of the boat and they enter into the reaction and contaminate the substrate. Another disadvantage is that the process is slow because only the exposed side of the substrate can be coated with a single operation. After one side has been coated the substrate must be turned over and the process repeated to coat the other side. Another serious disadvantage of this process is that the surface of the substrate is often scratched, scarred or otherwise damaged by contact with the graphite boat.

Still another disadvantage of this process is that the graphite boat also receives a coating of silicon and this coating then acts as a diffusion source which seriously limits the thinness of a deposit or overgrowth and also makes accurate control of the resistivity of the deposit or overgrowth extremely difficult.

Another known epitaxial process for depositing an overgrowth layer on a substrate places the substrate on a pedestal in the quartz reaction chamber.

These prior art processes require large amounts of power which heats the quartz reaction chamber to temperatures which allow contaminants in the quartz to enter into the reaction stream and subsequently into the silicon deposit.

It is a principal object of this invention to provide apparatus for epitaxially depositing an overgrowth on a substrate wherein the above-mentioned disadvantages of the prior art apparatus are substantially eliminated.

It is another object of this invention to provide apparatus for epitaxially depositing an overgrowth on a substrate wherein the above-mentioned disadvantages of the prior art apparatus are substantially eliminated.

It is another object to provide improved apparatus for epitaxially depositing an overgrowth onto a substrate.

It is another object to provide improved apparatus for epitaxially depositing an overgrowth onto a substrate wherein the apparatus is substantially prevented from entering into the reaction.

It is another object to provide improved apparatus for epitaxially depositing an overgrowth onto a substrate wherein the surface of the substrate is not damaged by contact with the apparatus.

It is another object to provide improved apparatus for simultaneously epitaxially depositing an overgrowth on all sides of a substrate.

It is another object to provide an improved process and apparatus for simultaneously epitaxially depositing an overgrowth of silicon on two sides of a silicon substrate.

Other objects and advantages of the invention will be apparent from the following detailed description, taken in connection with the accompanying drawings, in which.

Throughout the description which follows like reference characters refer to like elements in the various figures of the drawing.

Figure 1:
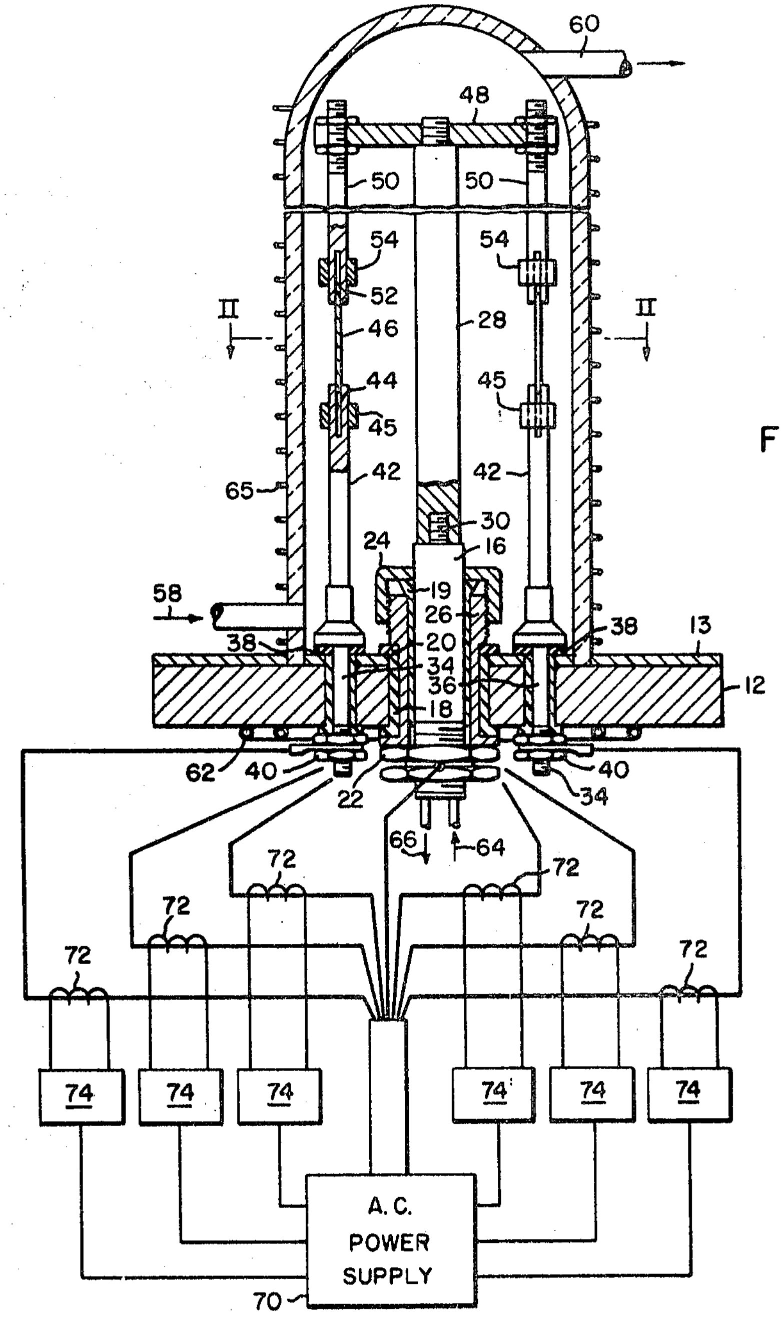
FIGURE 1 is a vertical cross section through the apparatus provided by this invention.

Referring to the drawings, an improved reaction chamber 10, as provided by this invention is shown in vertical section in FIG. 1.

The reaction chamber 10 comprises a base member 12 which is made of brass or some other suitable metal. A plate 13 made of silver or some other suitable material, is soldered to the brass base 12. A quartz reaction vessel or tube 14 is supported on the base 12. The vessel 14 is removable from the base 12; however, it will be appreciated that when the apparatus is in operation a gas tight seal is maintained between the base 12 and the vessel 14.

A silver stud 16 extends through the base 12 and into the vessel 14. The stud 16 is electrically insulated from the base 12 by gaskets 18, 19 and 20. The gaskets 18, 19 and 20 are preferably made of polytetrafluoroethylene, which is known commercially as Teflon. Suitable pressure is maintained on the gaskets to obtain a gas tight seal between the stud 16 and the base 12 by means of the nut 22 threaded on the lower end of the stud 18 and the nut 24 which is threaded on the upper end of a silver bushing 26. A graphite rod 28 is screw threaded onto the upper end of the stud 18 at 30 and extends upwardly into the vessel 14.

Figure 2:
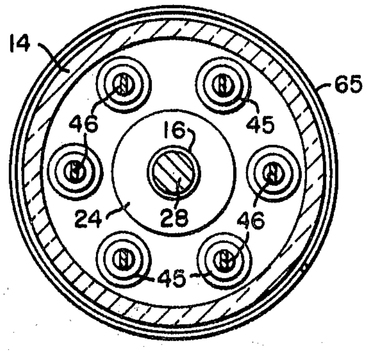
FIG. 2 is a sectional view taken along line II—II of FIG. 1.

As seen from FIGS. 1 and 2, six silver studs 34, located symmetrically about the central stud 16, extend through the base 12 and project into the vessel 14. The studs 34 are each electrically insulated from the base 12 by a sleeve 36 and a washer 38. These sleeves and washers are also preferably made of polytetrafluoroethylene. Pressure is applied to the studs 34 with nuts 40 maintaining a gas tight seal between the studs 34 and the base 12. Each of the studs 34 has a graphite rod 42 attached to its upper end. The rods 42 have slots 44 in their upper ends and each rod 42 is equipped with a tapered graphite slip ring 45 for applying pressure to a substrate member 46 which is mounted in the slot 44.

The upper end of the central graphite rod 28 has attached thereto a graphite disk 48. Six graphite rods 50 are attached to the disk 48 and depend downwardly into the vessel 14, with a rod 50 in line with each of the upwardly extending rods 42. Each of the rods 50 has a slot 52 in its lower end and each rod 50 is equipped with a graphite slip ring 54 for applying pressure to a substrate member 46.

The substrate member 46 expands and contracts during the overgrowth process because of the temperature excursion and becomes plastic at temperature substantially above 700° C.; therefore, the pressure applied to the ends of the substrate member 46 must be sufficient to hold the member 46 in the slots 44 and 52, but also slight enough to permit the ends of the substrate member 46 to move during the process. If the ends of the substrate member 46 are rigidly fixed there is a good possibility that the substrate member 46 would be rendered useless for the purpose of depositing an overgrowth layer thereon by the expansion and contraction forces during the overgrowth process.

The substrate member shown in FIG. 1 is a short piece of single crystal silicon dendritic material about four mils thick. However, it is emphasized that different lengths and thickness of substrate may be processed in the chamber merely by adjusting the length of the graphite rods 42 and 50 or equipping the chamber 10 with a desired length of rods 42 and 50.

Silicon dendritic web is superior to any known mechanically prepared substrate, since it has very smooth undamaged surfaces and a very low dislocation density and extreme uniformity of electrical properties. It is also emphasized that silicon dendritic web about four mils thick would be fairly plastic at deposition temperatures of approximately 1200° C. and would not be self-supporting at the deposition temperature used in this invention. Consequently, the dendritic web is supported at each end in a substantially vertical position to prevent distortion which would make the dendritic web useless as a substrate for the deposition of an overgrowth layer.

To produce overgrowth onto the substrate member 46 hydrogen gas, a silicon containing halide, and a dopant, if a dopant is required, is injected into the chamber at 58 and the excess gas is removed at 60. The perfection and resistivity of the overgrowth layer is controlled by the mass flow rate, the concentrations of the halide and dopant, the temperature, and the perfection of the substrate 46. The rate of deposition of the overgrowth layer is about 0.002 inch per hour, which is considered rapid compared to the known diffusion processes. Those skilled in the art will realize that practically any available halide will contain donor and/or acceptor impurities and in some instances these impurities will exist in such quantities that it will not be necessary to add additional dopant to practice this invention and to achieve the desired resistivity level of the epitaxial deposit.

The lower side of the base 12 of the chamber 10 is equipped with a radiator 62 through which a suitable coolant is circulated to keep the temperature of the base 12 from exceeding about 150° C. during the process. This cooling of the base 12 prevents the base 12 from entering into the process and injecting impurities into the overgrowth layer.

The central stud 16 and central graphite rod 28 are also bored and equipped with connections for circulating coolant in at 64 and out at 66 to keep the central stud 16 and rod 28 from exceeding about 150° C. This cooling of the stud 16 and rod 28 prevents these elements from entering into the overgrowth process and injecting impurities into the overgrowth layer. It is important that the stud 16 and rod 28 be provided with coolant, since it will be seen that these elements carry all of the current used in the process.

Figure 3:
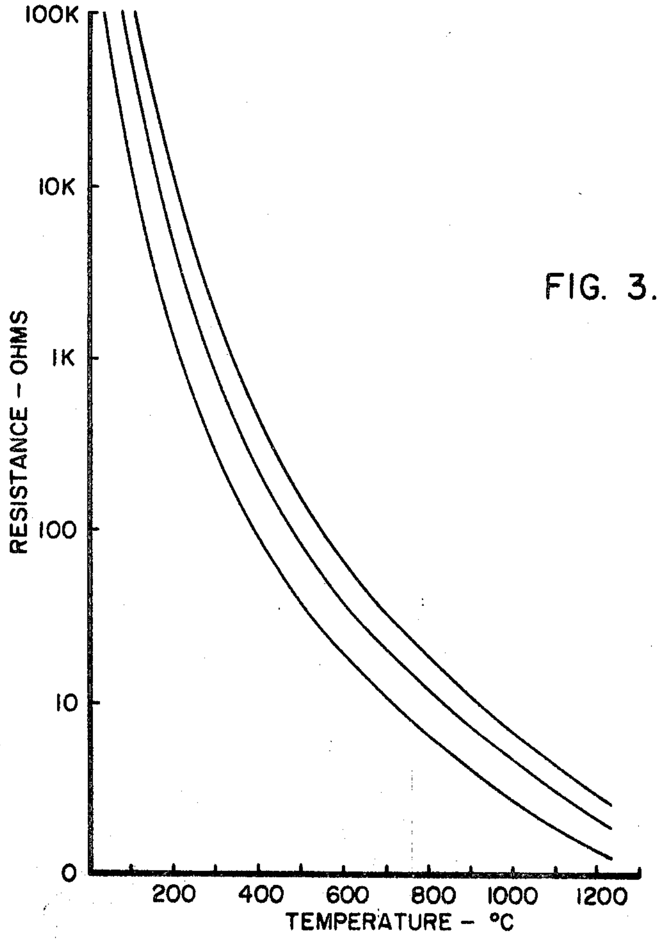
FIG. 3 is a resistance (ohms)-temperature (° C.) characteristic chart for three typical silicon substrate samples.

The vessel 14 is surrounded by a pre-heater coil 65. This coil 65 may be supplied from any suitable source of electric power. However, it is emphasized that other means, such as radiant heaters or any other suitable heater may be used to pre-heat the vessel 14 and the substrate 46. It is desirable to pre-heat the substrate 46 before starting the process since the substrate member 46 is heated solely by the electric current passing through the member. As seen from FIG. 3, the resistance of the three good grade silicon substrate samples illustrated decreases very rapidly with increases in temperature. The resistance of good grade silicon substrate at approximately 72° F. is in the order of $10^6$ ohms. Consequently, it is seen that if the process is started at room temperature, a very high voltage would be required to force current through the substrate member 46 upon starting the process but as the temperature increases the current will increase very rapidly because of the rapid decrease in the resistance of the substrate with increase in temperature. This rapid increase of current is difficult to control. Therefore, it has been found advisable to preheat the substrate member 46 to a temperature range wherein the start-up voltage is low enough to force current of high enough value through the substrate member 46 to heat the substrate member 46 to the desired temperature and also permit good control of the current. The melting point of silicon is about 1450° C. The temperature of 1200° C. for the reaction is chosen for best growth conditions. Below it crystal growth is poorer; above it the danger of melting is greater from hot spotting. It is very important that the temperature of the substrate not be allowed to substantially exceed 1200° C., since pure silicon begins to become plastic if heated substantially above 750° C., which would consequently destroy the substrate, as far as providing a base for epitaxially depositing an overgrowth of silicon thereon.

In the method disclosed herein for epitaxially depositing a single crystal silicon overgrowth onto a single crystal silicon substrate the substrate is heated to 1200° C.±25° C. to cause the silicon halide to deposit out of the gas and form a layer on the substrate. In the method and apparatus provided by this invention the heating of the substrate is done entirely by resistive heating by passing an electric current through the substrate.

Although a specific temperature range has been disclosed for depositing an overgrowth layer on a silicon substrate, it is to be understood that this range is not critical and temperatures above or below this range may be used for depositing overgrowth layers having certain characteristics different from the layer described herein.

Referring again to FIG. 1, it is seen that each substrate member 46 is a link in an independent electrical circuit. The circuit for heating each substrate member 46 is from the alternating current power supply 70, through the central stud 16, through the central graphite rod 28, through the graphite disk 48, through the graphite rod 50, through the substrate member 46, and through the graphite rod 42 back to the power supply 70. Since the current applied to the substrate circuits must be carefully controlled to prevent overheating of the substrate member when the temperature of the substrate member begins to rapidly rise a current transformer 72 is associated with one conductor of each substrate circuit for sensing the current flowing in the respective circuit. The output from each of the current transformers 72 is connected to a current regulator 74. The output from each current regulator 74 is connected to the power supply 70 for regulating the current in the respective substrate circuits. This arrangement for regulating the current flow is considered to be conventional in the current regulating art. However, it is considered novel in this invention in that the current in each substrate circuit is independently controlled.

Since the substrate member is a part of the electrical circuit which heats the substrate member 46, it is seen that one or any other desired number of substrate members 46 may be inserted into the chamber 10 and epitaxially coated on two sides with an overgrowth layer.

Figure 4:
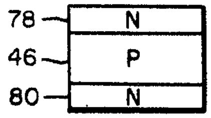
FIG. 4 is a cross sectional view through a typical piece of substrate after an overgrowth has been deposited on two sides thereof.

FIG. 4 illustrates a cross section of a silicon dendritic substrate member 46 on which has been epitaxially deposited overgrowth layers 78 and 80 according to the teaching of this invention. The silicon dendritic substrate is drawn with a pair of parallel mirror finish surfaces. Since these mirror finish surfaces are not damaged by contact with any other surface during the process, the overgrowth layers 78 and 80 also have mirror finish surfaces identical to the dentritic surfaces on which they are deposited. This high quality finish, or surfaces, of the overgrowth layers eliminates the necessity of any lapping or etching of the overgrowth surfaces before the substrate is used to make devices, such as rectifiers or transistors, such as it required in the prior art processes wherein the surfaces of the substrate are often damaged by contact with the hot graphite boat or other parts of the equipment.

In the process provided by this invention the substrate member may be P-type, N-type or intrinsic and the overgrowth layers may also be P-type, N-type or intrinsic. However, it is understood that the type of the substrate and the type of the overgrowth layers will be determined by the type of dopant used in making the substrate and in depositing the overgrowth layers.

In the operation of the apparatus described herein to practice the epitaxial process described herein to deposit an overgrowth onto a substrate, the desired number of substrate members 46 are first attached to the graphite rods 42 and 50. In the apparatus illustrated this may be one substrate member or any number up to six; however, it is to be understood that the apparatus may be modified to handle more than six substrate members at a time, if desired. After the substrate members 46 have been loaded into the graphite rods 42 and 50, the vessel 14 is sealed to the base 12. Next the air is removed from vessel 14 and the chamber 10 is pre-heated to bring the temperature of the silicon substrate member 46 up to a temperature at which their resistance is of a value such that current flow in the substrate members may be readily controlled. Next electrical power is turned on to cause current to flow through the substrate members 46 to resistively heat the substrate members to a temperature of approximately 1200° C. ±25° C. After the silicon substrate members 46 have been raised to the proper temperature, hydrogen gas containing a silicon containing halide and the proper dopant is passed through the chamber 10. The halide is decomposed by the hydrogen and heat into silicon and other halides at a temperature of approximately 1200° C. and a layer of doped silicon deposits on the silicon substrate member 46. The perfection and resistivity of the layer of doped silicon formed on the silicon substrate member 46 are controlled by the mass flow rate of the hydrogen, the concentrations of the silicon halide and the dopant, the temperature of the substate, and the perfection of the substrate. The rate of deposition of the silicon layer on the silicon substrate 46 is approximately 0.002 inch per hour, which rate is considered rapid compared to other processes for forming layers of silicon.

Throughout the entire process coolant is circulated through the coils 62 to keep the temperature of the base 12 below the reaction temperature and also through the stud 16 and central graphite rod 28 to keep the temperature of these elements below the reaction temperature.

The apparatus and process provided by this invention provides many advantages over the prior art apparatus and process. One very important advantage is that only the silicon substrate is heated and receives an overgrowth layer. Another important advantage is that the apparatus is not heated to a temperature high enough to drive impurities out of the apparatus, which impurities might contaminate the overgrowth layer. Another important advantage is that a plurality of substrate members may be coated with an overgrowth layer on two sides at the same time. Still another important advantages is that the surfaces of the substarte that are coated with an overgrowth layer never contact the apparatus in a manner which might scratch or otherwise damage the mirror finish surface of the substrate.

Still another important advantage of this process is the fact that the apparatus does not enter into the reaction which makes possible very closely controlled multiple junctions, very thin defined deposits, and also makes possible the production of various desired types of graded junctions.

It will be understood that this invention is capable of various modifications and embodiments, and is not limited to the specific details of construction shown in the drawing for the purpose of illustration.

We claim as our invention:

1. Apparatus for epitaxially depositing an overgrowth layer of single crystal silicon onto a single crystal substrate member comprising:

(1) a closed vessel;

(2) means for supporting a plurality of single crystal silicon substrate members in said vessel;

(3) a separate electrical resistance heating circuit means for each single crystal silicon substrate member for heating each member to a predetermined elevated temperature range;

(4) means connected to each electrical resistance heating circuit means for continually sensing the electrical current flowing through the substrate of each circuit;

(5) means responsive to said current sensing means to individually regulate the power input to the respective electrical resistance heating means monitored by said current sensing means;

(6) means for preheating said closed vessel and said substrate member, said means being independent of said separate electrical resistance heating circuit means;

(7) means for cooling selected portions of said vessel and said support means; and (8) a gas flow system means for circulating a carrier gas and a silicon producing gas about each substrate member.

2. Apparatus of claim 1 wherein said supporting means comprises a central support member about which the substrate members are radially disposed, said central support member being a common component of each substrate's electrical resistance heating circuit means.

3. Apparatus of claim 2 in which the means responsive to said current sensing means limits the respective substrate member from exceeding a predetermined maximum temperature of approximately 1200° C.

4. Apparatus of claim 3 and including means for introducing a dopant material into said hydrogen gas and said silicon halide.

(References on following page)

References Cited

UNITED STATES PATENTS

| | | | |
|---|---|---|---|
| 1,601,931 | 10/1926 | Arkel | 148—1.6 |
| 2,854,318 | 9/1958 | Rummel | 148—1.6 |
| 3,011,877 | 12/1961 | Schweickert et al. | 148—175 |
| 3,030,189 | 4/1962 | Schweickert et al. | 148—175 |
| 3,042,493 | 7/1962 | Reuschel et al. | 148—175 |
| 3,058,812 | 10/1962 | Chu et al. | 148—175 |
| 3,117,859 | 1/1964 | Chandrasekhar | 148—1.6 |
| 3,145,447 | 8/1964 | Rummel | 148—1.6 |
| 3,146,123 | 8/1964 | Bischoff | 148—175 |
| 3,147,141 | 9/1964 | Ishizuka | 148—1.6 |
| 3,151,006 | 9/1964 | Grabmaier et al. | 148—174 |
| 3,152,022 | 10/1964 | Christensen et al. | 148—175 |
| 3,157,541 | 11/1964 | Heywang et al. | 148—174 |
| 3,161,474 | 12/1964 | Sirtl | 148—1.6 |
| 3,172,791 | 3/1965 | Allegretti et al. | 148—175 |
| 3,226,270 | 12/1965 | Miederer et al. | 148—174 |
| 3,271,209 | 9/1966 | Rummel | 148—175 |

L. DEWAYNE RUTLEDGE, Primary Examiner

P. WEINSTEIN, Assistant Examiner

U.S. Cl. X.R.

117—106, 107; 118—8, 49; 148—1, 174, 175